United States Patent
Vinod et al.

(10) Patent No.: US 10,984,347 B2
(45) Date of Patent: Apr. 20, 2021

(54) METHOD, APPARATUS AND COMPUTER PROGRAM PRODUCT FOR RESERVATIONS, INVENTORY CONTROL, SHOPPING, AND BOOKING WITH ATTRIBUTE BASED PRICING

(71) Applicant: SABRE GLBL INC., Southlake, TX (US)

(72) Inventors: Ben Vinod, Grapevine, TX (US); David Hobt, Flower Mound, TX (US)

(73) Assignee: Sabre GLBL Inc., Southlake, TX (US)

( * ) Notice: Subject to any disclaimer, the term of this patent is extended or adjusted under 35 U.S.C. 154(b) by 862 days.

(21) Appl. No.: 14/705,391

(22) Filed: May 6, 2015

(65) Prior Publication Data

US 2016/0328662 A1 Nov. 10, 2016

(51) Int. Cl.
*G06Q 10/02* (2012.01)
*G06F 16/22* (2019.01)
*G06Q 50/12* (2012.01)

(52) U.S. Cl.
CPC ......... *G06Q 10/02* (2013.01); *G06F 16/2291* (2019.01); *G06Q 50/12* (2013.01)

(58) Field of Classification Search
CPC ... G06Q 10/02; G06Q 50/12; G06F 17/30342
USPC .......................................................... 705/5
See application file for complete search history.

(56) References Cited

U.S. PATENT DOCUMENTS

| | | | |
|---|---|---|---|
| 7,328,166 B1 | 2/2008 | Geoghegan et al. | |
| 10,025,599 B1 * | 7/2018 | Goodson | G06F 9/541 |
| 2003/0061145 A1 * | 3/2003 | Norrid | G06Q 10/02 705/37 |
| 2004/0039660 A1 * | 2/2004 | Prescott | G06Q 10/02 705/5 |
| 2004/0267567 A1 * | 12/2004 | Barrera | G06Q 10/02 705/2 |

(Continued)

OTHER PUBLICATIONS

Green et al.; "Distribution Channel Analysis: a Guide for Hotels." Published by HSMAI Foundation, 2012. Retrieved from https://clients.theygsgroup.com/hsmai-uploads/DCAbook_Full.pdf (Year: 2012).*

(Continued)

*Primary Examiner* — John P Go
*Assistant Examiner* — Bryan J Kirk
(74) *Attorney, Agent, or Firm* — Baker Botts L.L.P.

(57) ABSTRACT

A method is provided for booking a hotel room that improves the satisfaction level for a consumer and increases revenue for the hotelier. Consumers may benefit from being able to select property-specific and room-specific attributes for which they perceive enhanced value, while property-specific and room-specific attributes that a consumer does not particularly value may be avoided in an effort for the consumer to spend on features they desire. Further, hoteliers may benefit from being able to offer room-specific attributes and add-on features that create additional revenue streams for the hotel. Additionally, the transparency afforded the consumer of the room-specific attributes available versus those selected provides the consumer with a level of expectation that is more aligned with the hotel and the specific room they selected, thereby improving customer satisfaction.

17 Claims, 6 Drawing Sheets

(56) References Cited

U.S. PATENT DOCUMENTS

| | | | | |
|---|---|---|---|---|
| 2007/0075136 | A1* | 4/2007 | Jacob | G06Q 10/02 |
| | | | | 235/383 |
| 2007/0245351 | A1* | 10/2007 | Sussman | G06F 9/50 |
| | | | | 718/104 |
| 2008/0091480 | A1* | 4/2008 | Geoghegan | G06Q 10/02 |
| | | | | 705/5 |
| 2009/0030743 | A1* | 1/2009 | Tussy | G06Q 10/02 |
| | | | | 705/5 |
| 2010/0332329 | A1* | 12/2010 | Roberts | G06Q 30/0269 |
| | | | | 705/14.66 |
| 2014/0136377 | A1* | 5/2014 | Taylor | G06Q 10/087 |
| | | | | 705/28 |

OTHER PUBLICATIONS

Cline, Roger *Hospitality 2000: The Technology, Groundbreaking study probes industry challenges.* [online] [retrieved Sep. 28, 2015]. Retrieved from the Internet <URL: www.roundhillhospitality.com/pdf/08_hosp2000_tech.pdf>. (undated) 6 pages.

*Should your Inventory Be Managed Through the PMS or the CRS* [online] [retrieved Sep. 28, 2015]. Retrieved from the Internet: <URL: http://www.hosipitalityupgrade.com/_magazine/magazine_detail.asp?ID=6>. (Jun. 16, 2006) 3 pages.

International Search Report and Written Opinion for corresponding International Application No. PCT/IB2016/052517, dated Jun. 29, 2016.

* cited by examiner

METHOD, APPARATUS AND COMPUTER PROGRAM PRODUCT FOR RESERVATIONS, INVENTORY CONTROL, SHOPPING, AND BOOKING WITH ATTRIBUTE BASED PRICING

TECHNICAL FIELD

Example embodiments of the present invention relate generally to hotel reservation systems, and more particularly, to a hotel registration system that includes attribute-based pricing reservations and inventory control of rooms and additional features to enhance hotelier revenue streams.

BACKGROUND

Modern technology has brought about advances in virtually every industry. One particular industry that has benefited from modern technology such as the internet is the hospitality industry. The available hotels for a city or region can be found easily by a user through any number of available websites. Further, a user can book a hotel room through a number of different channels, ranging from a phone call to a hotel's reservation desk to booking through an online interface. While these technological advances have made it easier for consumers to select and book hotel rooms, these technological advances have made the booking process for hotels extremely complex in order to make available as many booking channels as possible.

BRIEF SUMMARY

In general, example embodiments of the present invention provide an improved method of booking a hotel room for both a consumer and for the hotelier. Consumers may benefit from being able to select property-specific and room-specific attributes for which they perceive enhanced value, while property-specific and room-specific attributes that a consumer does not particularly value may be avoided in an effort for the consumer to spend on features they desire. Further, hoteliers may benefit from being able to offer room-specific attributes and add-on features that create additional revenue streams for the hotel. Additionally, the transparency afforded the consumer of the room-specific attributes available versus those selected provides the consumer with a level of expectation that is more aligned with the hotel and the specific room they selected, thereby improving customer satisfaction.

According to some embodiments, methods may include storing, in a database, hotel rate structure by room type and rate level for one or more properties and storing in the database room-specific attribute pricing structures for one or more room-specific attributes. A room request may be received at a processor that includes request parameters including at least one room-specific attribute. The inventory may be analyzed to determine availability of a room that satisfies the request parameters. A rate may be calculated for a room satisfying the request parameters in response to a room being available that satisfies the request parameters. A booking request may then be received to book the room satisfying the request parameters. A forced sell message may then be sent in response to the booking request. Methods may optionally include storing, in the database, property attributes for one or more properties. Room-specific attributes may include at least one of whether or not the room includes a balcony, whether or not the room includes a refrigerator, whether or not the room includes network connectivity (e.g., WiFi), the type of view from the room, the number of beds in the room, or the floor level of the room. Providing for transmission of the forced sell message may be provided for transmission to a hotel guest reservation system (GRS) and/or a property management system (PMS). The forced sell message may include an inventory decrement instruction with a room type and date range.

According to some embodiments, the hotel guest reservation system and/or the property management system may include a look-ahead window of time, where the request parameters include a date range. Providing for transmission of a forced sell message may include awaiting arrival of at least a portion of the date range in the look-ahead window prior to transmission of the forced sell message when the date range is outside of the look-ahead window at the time the room request was received. Embodiments may include mapping room-specific attributes to individual rooms. Methods may include storing room inventory including the room-specific attributes, where in response to receiving a booking request to book the room satisfying the request parameters, the inventory of the room satisfying the request is decremented. Methods may optionally include receiving a sell request with room sell request parameters, decrementing the inventory of the room satisfying the sell request parameters, and sending a sell response confirming the booking of a room satisfying the sell request parameters.

Embodiments described herein may provide a hotel reservation system including at least one processor and at least one memory including computer program code. The at least one memory and the computer program code are configured to, with the at least one processor, cause the hotel reservation system to store, in a database, hotel rate structure by room type and rate level for one or more properties and to store in the database room-specific attribute pricing structures for one or more room-specific attributes. The hotel reservation system may be caused to analyze inventory to determine availability of a room that satisfies the request parameters, calculate a rate for a room satisfying the request parameters in response to a room being available that satisfies the parameters, and receive a booking request to book the room satisfying the request parameters. The hotel reservation system may be caused to update inventory to reflect the booking of the room satisfying the request and to provide for transmission of a forced sell message. The database may further store property attributes for the one or more properties. Room-specific attributes may include at least one of whether or not the room includes a balcony, whether or not the room includes a refrigerator, whether or not the room includes network connectivity, the type of view from the room, the number and type of beds in the room, or the floor level of the room.

According to some embodiments, causing the hotel reservation system to provide for transmission of a forced sell message may include causing the hotel reservation system to provide for transmission of a forced sell message to at least one of a hotel guest reservation system or a property management system. The forced sell message may include an inventory decrement instruction with a room type and date range. The at least one of the hotel guest reservation system and the property management system may include a look-ahead window of time, where the request parameters include a date range. Causing the hotel reservation system to provide for transmission of a forced sell message may include causing the hotel reservation system to await arrival of at least a portion of the date range in the look-ahead window prior to transmission of the forced sell message when the date range is outside of the look-ahead window at the time the room request was received. The hotel reservation system may map room-specific attributes to individual rooms. The hotel reservation system may be caused to store room inventory including the room-specific attributes, where the hotel reservation system receiving a booking request to book the room satisfying the request parameters may cause the hotel reservation system to decrement the inventory of the room satisfying the request parameters. The hotel reservation system of some embodiments may be caused to receive a sell request including sell request parameters, decrement the inventory of the room satisfying the sell request parameters, and send a sell response confirming a booking of a room satisfying the sell request parameters.

Embodiments of the present invention may provide a computer program product including at least one non-transitory computer-readable storage medium having computer executable program code instructions stored therein. The computer-executable program code instructions may include program code instructions for storing, in a database, hotel rate structure by room type and rate level for one or more properties and room-specific attribute based pricing structures for one or more room-specific attributes. The computer-executable program code instructions may further include program code instructions for receiving a room request including request parameters with at least one room-specific attribute, program code instructions for analyzing inventory to determine availability of a room that satisfies the request, program code instructions for calculating a rate for a room satisfying the request parameters when a room satisfying the request parameters is available, and program code instructions for receiving a booking request to book the room satisfying the request parameters. The computer-executable program code instructions may optionally include program code instructions for updating inventory to reflect the booking of the room satisfying the request parameters and program code instructions to provide for transmission of a forced sell message. According to some embodiments, the computer-executable program code instructions may include program code instructions for mapping room-specific attributes to individual rooms, program code instructions for storing room inventory including the room-specific attributes, and program code instructions for decrementing the inventory of the room satisfying the request parameters in response to receiving a booking request to book the room satisfying the request parameters.

BRIEF DESCRIPTION OF THE DRAWINGS

Figure 1:
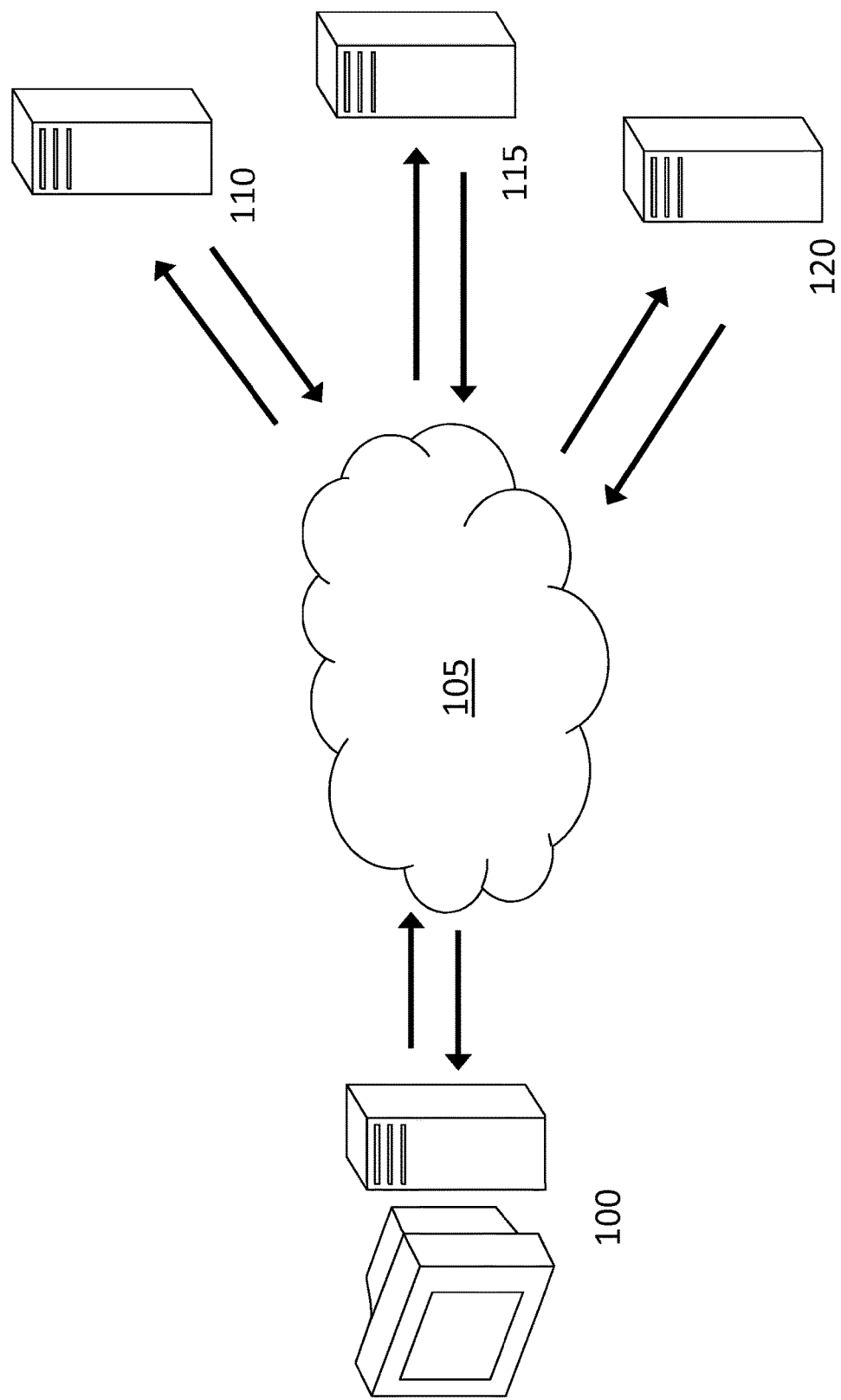
Figure 2:
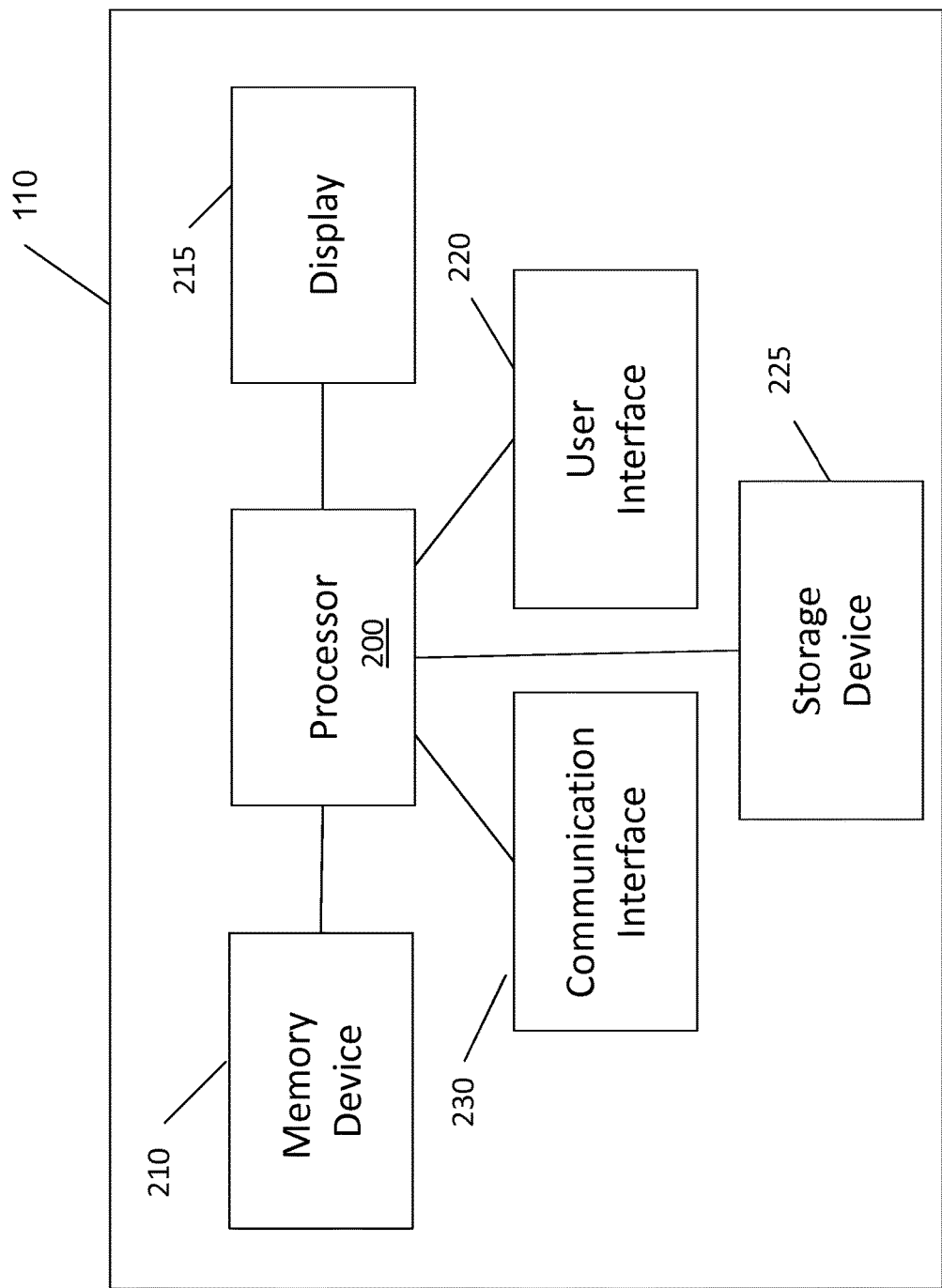
Figure 3:
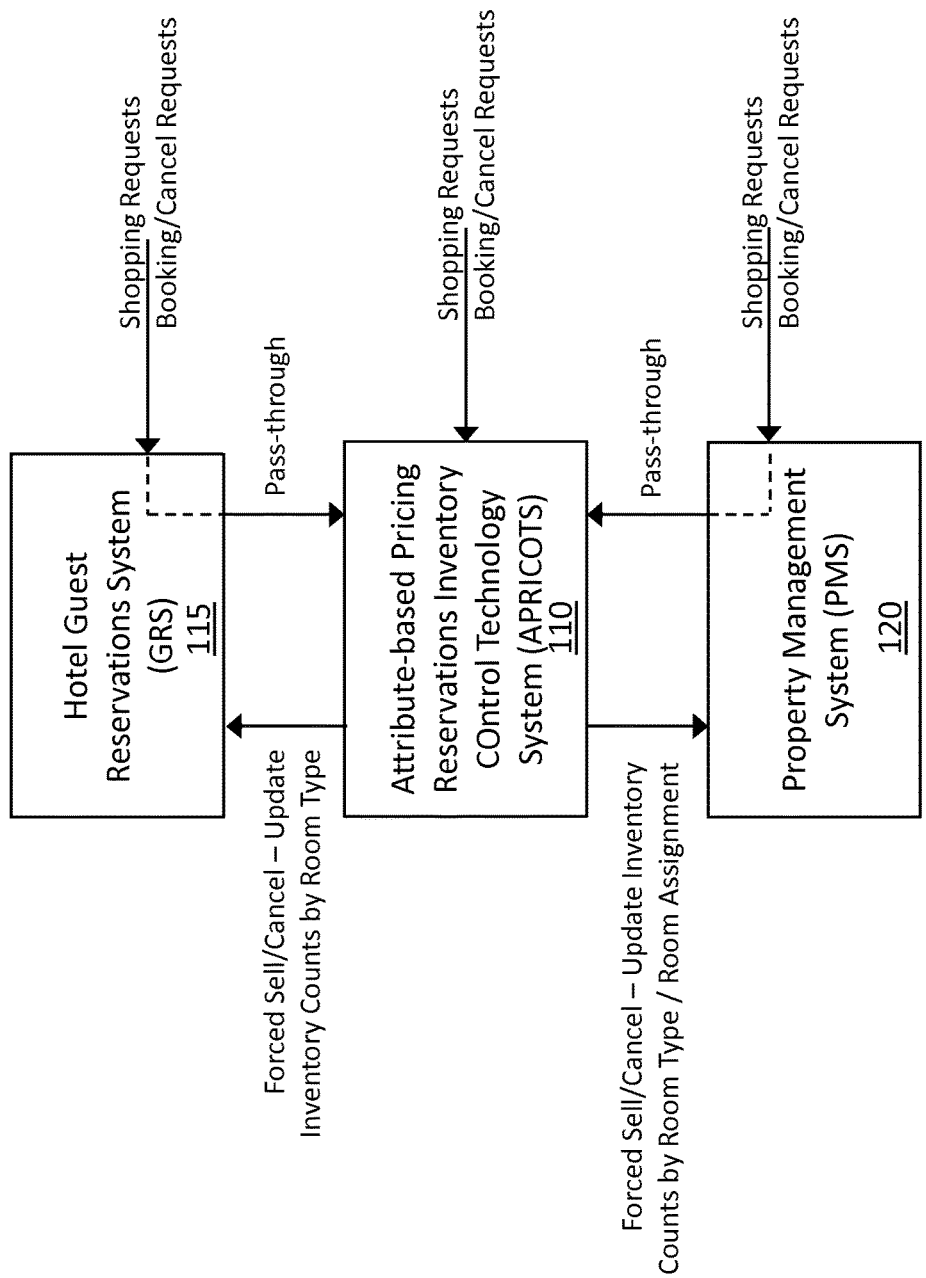
Figure 4:
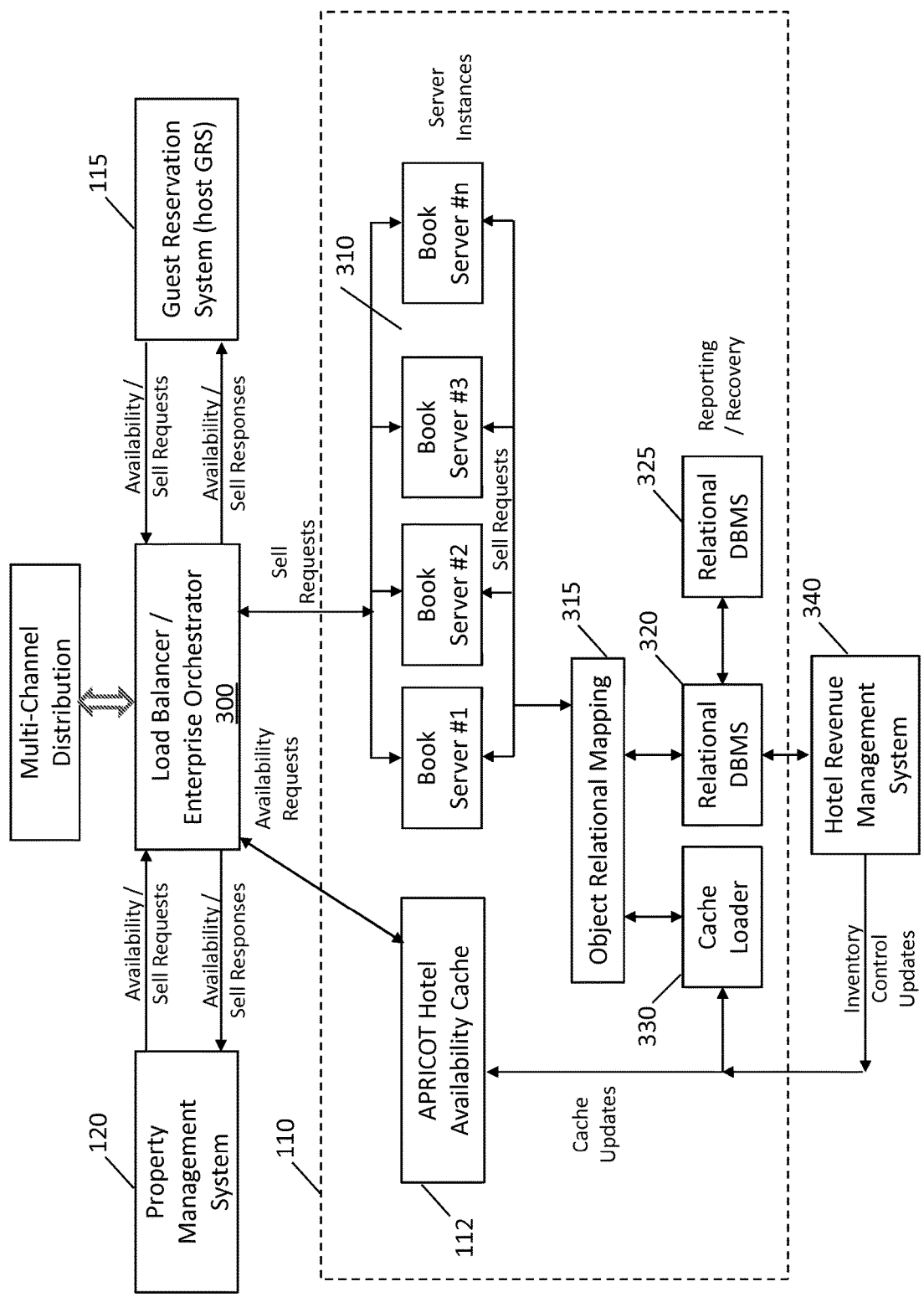
Figure 5:
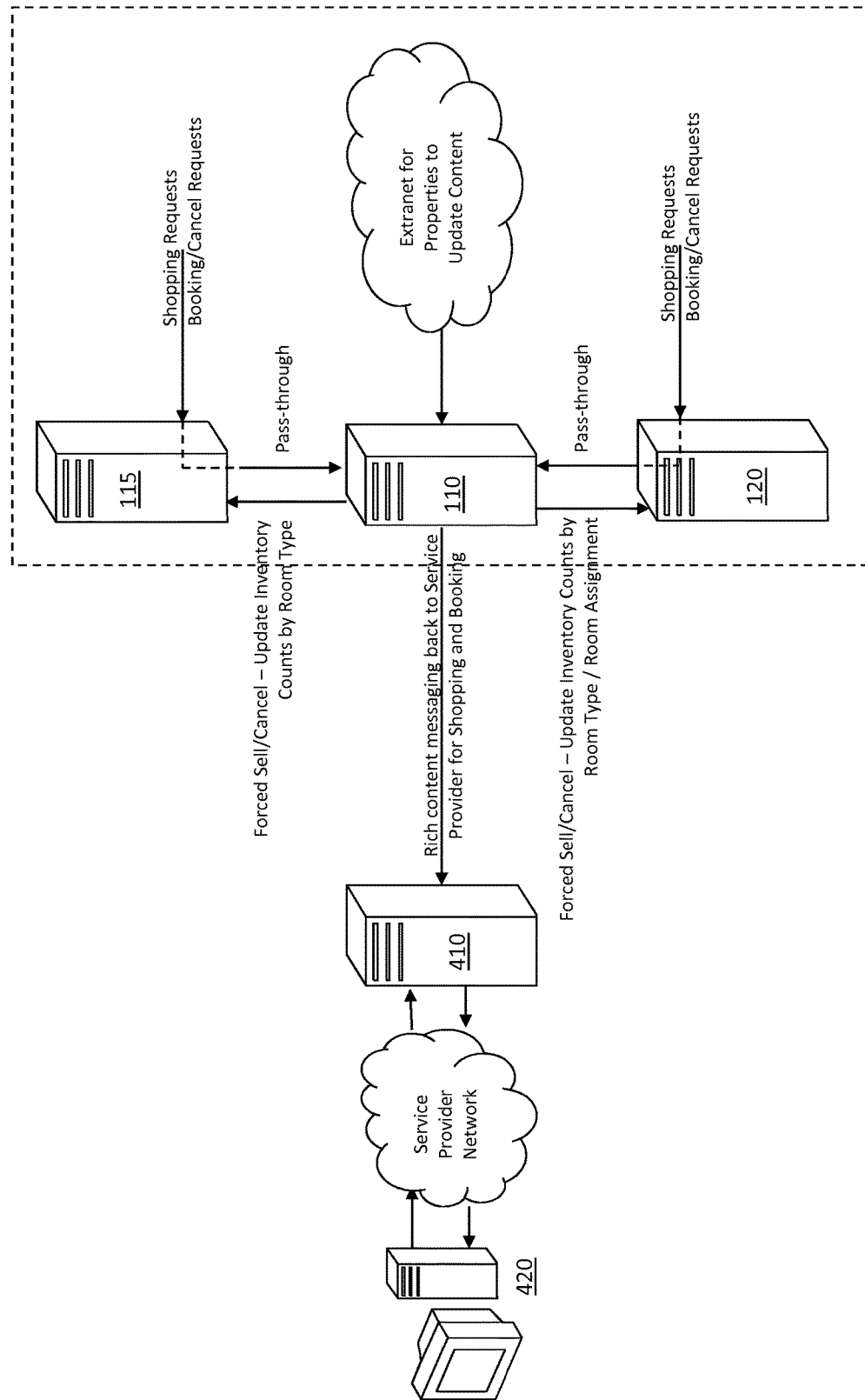
Figure 6:
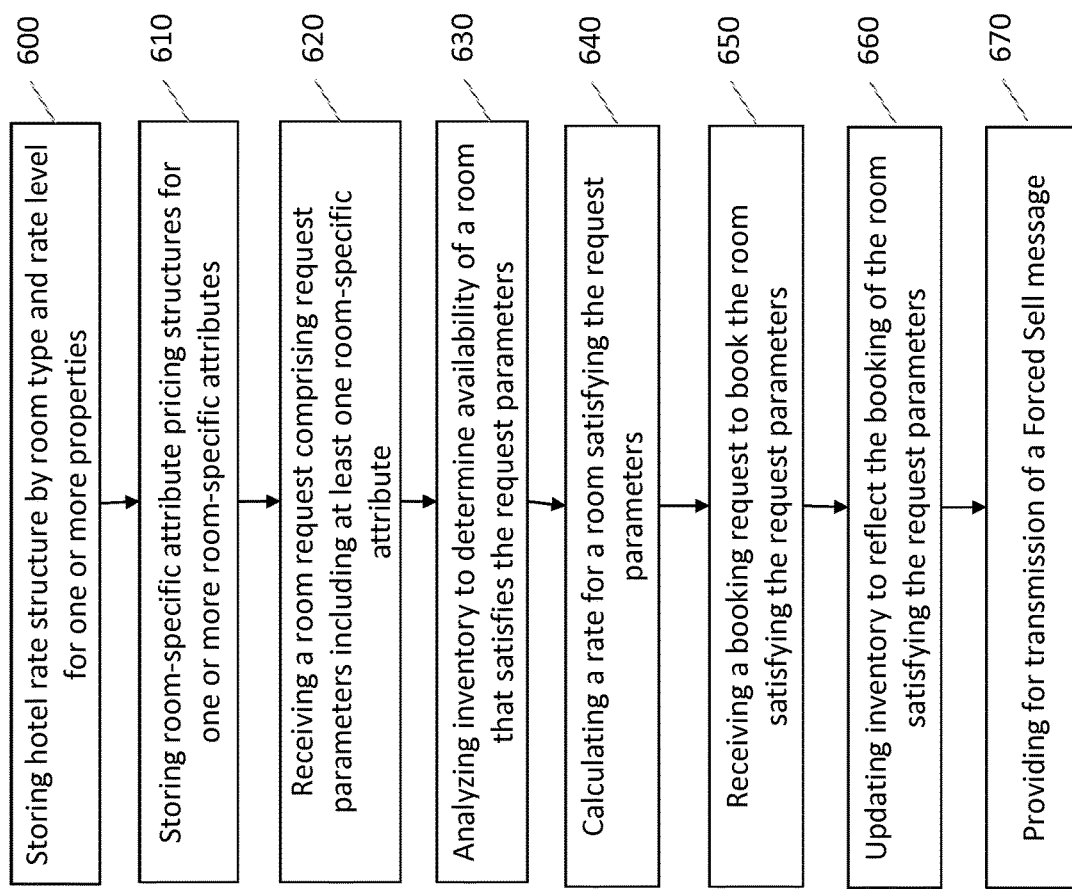

Having thus described example embodiments of the invention in general terms, reference will now be made to the accompanying drawings, which are not necessarily drawn to scale, and wherein:

FIG. 1 illustrates a communication system in accordance with an example embodiment of the present invention;

FIG. 2 illustrates a block diagram of an attribute based pricing reservations inventory control technology system according to an example embodiment of the present invention;

FIG. 3 depicts communication flow through various hotel reservation systems according to an example embodiment of the present invention;

FIG. 4 illustrates networked entities which may be implemented in an attribute-based pricing reservations inventory control technology system according to an example embodiment of the present invention;

FIG. 5 depicts a proxy deployment of an attribute-based pricing reservations inventory control technology system according to an example embodiment of the present invention; and FIG. 6 is a flow chart of a method for implementing an attribute-based pricing reservations inventory control technology system according to an example embodiment of the present invention.

DETAILED DESCRIPTION

Some example embodiments of the present invention will now be described more fully hereinafter with reference to the accompanying drawings, in which some, but not all embodiments of the invention are shown. Indeed, various embodiments of the invention may be embodied in many different forms and should not be construed as limited to the example embodiments set forth herein; rather, these example embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention.

Provided herein is an attribute-based pricing and reservation inventory control technology (APRICOT) system to provide a level of flexibility during the hotel shopping and booking process that is unavailable today. Example embodiments provide precise hotel booking options while supporting millions of possible price points along a price-demand curve. The example embodiments described below enable customers to shop and book exactly what they want when they want it. As individual price points can be accurately inventory controlled, embodiments provide additional revenue streams for the hotelier by enabling them to obtain incremental income through attributes unique to each room available for booking.

Embodiments described herein further enhance the user hotel booking experience by allowing more precise control over what is booked and at what price, thereby enabling the customer to increase spending on attributes that the customer values while decreasing spending on attributes of little value to the specific customer. According to some embodiments, a hotel reservation system may include an attribute-based pricing and reservation inventory control technology system that is in communication with (and/or embodied by) a hotel guest reservation system (GRS) and and/or a property management system (PMS). Hotel rate structures by room type and rate level may be stored in the attribute-based pricing and reservation inventory control technology (APRICOT) system. Further, room-specific attribute pricing structures may also be stored in the APRICOT system, in order to capitalize on room-specific attributes through incremental pricing to obtain a total price of a selected room more accurately reflecting the value content of the room.

For the sake of brevity, hotels, motels, resorts, cruise ships and other businesses that rent rooms, villas, condominiums, or apartments to guests are herein referred to collectively as hotels. However, the term is not intended to be limiting to any specific type of property that rents guest accommodations. As will be understood in view of the foregoing and following disclosure, embodiments described herein can be applicable to any type of accommodation offered for rent to a guest.

FIG. 1 illustrates an example embodiment of a reservation system implemented in conjunction with various embodiments of the present invention. As shown in FIG. 1, an example embodiment of the reservation system may include a customer interface 100, which may include a personal computer (e.g., a laptop, desktop, or tablet-type computer), a mobile device (e.g., a PDA or cellular/smart phone), a computing kiosk, etc. As illustrated, the customer interface 100 may be in communication with one or more networks, such as network 105. The reservation system of example embodiments may further include an attribute-based pricing and reservation inventory control processing technology (APRICOT) system 110, a hotel guest reservation system (GRS) 115, and a property management system (PMS) 120. Each of the components of the system may be in electronic communication with, for example, one another over the same or different wireless or wired networks (e.g., network 105) including, for example, a wired or wireless Personal Area Network (PAN), Local Area Network (LAN), Metropolitan Area Network (MAN), Wide Area Network (WAN), or the like. Additionally, while FIG. 1 illustrates the various system entities as separate, standalone entities, the various embodiments are not limited to this particular architecture.

FIG. 2 illustrates the various components of an example embodiment of the APRICOT system 110 of FIG. 1. The APRICOT system 110 may include a processor 200 that may be embodied in a number of different ways. For example, the processor 200 may be embodied as a processing element, processing circuitry, a coprocessor, a controller or various other processing devices including integrated circuits such as, for example, an application specific integrated circuit (ASIC), a field programmable gate array (FPGA), a hardware accelerator, and/or the like.

In an example embodiment, the processor 200 may be configured to execute instructions stored in a memory (e.g., memory 210) or otherwise accessible to the processor 200. As such, whether configured by hardware or software methods, or by a combination thereof, the processor 200 may represent an entity capable of performing operations according to embodiments of the present invention when configured accordingly. For example, as discussed in more detail below, the reservation system, and the APRICOT system 110 may be configured, among other things, to facilitate accurate pricing, booking, and inventory control to improve both a user experience for the customer and a revenue stream for the hotelier. A display 215 may be present for providing information to a customer, a hotelier, or for a system administrator, as needed in various embodiments. The device 110 may further include a user interface 220 for customer, hotelier, or system administrator interface with the device 110 for purposes of booking, interfacing with reservations or inventory, or updating attributes and pricing, as will be apparent to one of ordinary skill in the art in view of the following disclosure. The user interface 220 may include a touch screen, keyboard, pointing device (e.g., mouse), or the like.

The memory device 210 may include transitory and non-transitory memory which may include both random access memory (RAM) and read only memory (ROM. The ROM may be used to store a basic input/output system (BIOS) containing the basic routines that help to transfer information to the different elements within the device 110.

The attribute-based pricing and reservation inventory control technology system 110 may further be in communication with a storage device 225, which may be used as a database for storing hotel rate structures by room type and rate level, in addition to room specific attribute pricing structures and add-on feature pricing and inventory. The storage device 225 may further be configured to store reservation information, room inventory together with room attribute information, and demand-based pricing information as will be detailed further below. The storage device may include a hard disk drive, a CD/DVD disk drive, an optical disk drive, solid state drive, or the like, for storing information on various computer-readable media. The storage device(s) 225 and its associated computer-readable media may provide non-volatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, and/or the like.

Further, a number of executable instructions, applications, scripts, program modules, and/or the like may be stored by the various storage devices 225 and/or within memory device 210. As described in more detail below, these executable instructions, applications, program modules, and/or the like may control certain aspects of the operation of the APRICOT system with the assistance of the processor 200 and operating system, although their functionality need not be modularized. In addition to the program modules, the APRICOT system 110 may store or be in communication with one or more databases.

The APRICOT system 110 may include a communication interface 230 for interfacing with various computing entities and networks. This communication may be via the same or different wired or wireless networks (or a combination of wired and wireless networks). For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. The APRICOT system 110 may be configured to communicate via wireless external communication networks using any of a variety of protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth™ protocols, wireless universal serial bus (USB) protocols, and/or any other wireless protocol.

It will be appreciated that one or more components of the attribute-based reservation inventory control technology system 110 may be located remotely from other APRICOT system components. For example, the storage device 225 may be located or in communication with a remote network entity. Further, one or more of the components may be combined and additional components performing functions described herein may be included in the device 110.

The ubiquity of online customer reviews for hotels belies the need of those hotels to bolster customer satisfaction by meeting the needs of guests in an efficient, cost-effective manner that tailors hotel and room attributes to individual customers. Many negative reviews of properties are based on misinformation, or a preconceived idea a guest may have about a hotel property and/or room. Negative reviews may result from a guest failing to understand drawbacks or features unavailable at a property, herein referred to as "property attributes," or failure of a property to adequately communicate these property attributes to a potential guest. Further, negative reviews may result from a guest failing to understand room amenities, herein referred to as "room specific attributes", not found in a room they booked at a hotel that they were anticipating. Therefore it is advantageous to hotels and to guests to be able to view and select property attributes and room attributes with greater transparency and customization in order to maximize guest satisfaction through guests selecting and understanding the hotel attributes and room attributes prior to arrival.

Property attributes may include attributes such as a property type, including airport proximity, bed and breakfast, resort, motel, historic, modern, etc. Property attributes may also include location, star rating, user ratings, distance from points-of-interest, etc. Other features of a hotel property that may be included in property attributes may include hotel amenities, such as WiFi (and any associated cost), workout facilities, pool, conference rooms, bar, restaurant, parking, etc.

Room specific attributes may include a bed type (king, queen, queen/queen, double/double, twin, etc.), a view type (garden, mountain, ocean, skyline, etc.), a room size (e.g., in square feet), an accessibility level, a floor level of the hotel, etc. Room specific attributes may also include features of the room such as a balcony, refrigerator, kitchenette, dining table, desk, computer docking station/monitor, television size, etc. Some of these attributes may be important to certain guests, while other ones of the attributes may be important to other guests. A more complete list of property-specific and room-specific attributes may be found below in Table A.

Some or all of these property attributes may be stored within the APRICOT system 110, such as in storage device 225. In addition to property attributes and room-specific attributes that may be stored, add-on features may be stored within storage device 225 for additional revenue stream opportunities for hotels. For example, an add-on feature may include options that are generally handled by a concierge. Add-on features may include limousine service (e.g., to/from an airport, event, or point-of-interest), theater tickets, sporting event tickets, activities (scuba, snorkeling, parasailing, etc.), restaurant bookings, sight-seeing tours, etc. Further these add-on items may be made available during the booking process with discounted prices available to the hotel, or available due to early-bookings that enable a business providing the add-on, if not the hotel itself, to better staff their activities and services.

While the property attributes are generally free of inventory encumbrances, the rooms and the add-on features may be limited to on-hand inventory. In particular, once rooms are identified with a particular set of room-specific attributes, the quantity of a particular combination of room-specific attributes may be very limited. In an example embodiment, a conventional hotel reservation system may see rooms only by bed type and/or view type. The hotel reservation system may assign reservations to a generic room of a guest-specified bed type and view type; however, additional features of each of these rooms may not be considered. Conventional reservation systems may include basic inventories at an aggregate level without regard for specific rooms or room-specific attributes. In such an embodiment, a guest may, upon arrival, request a specific room attribute, such as a room on a high floor; however, this request may be processed only manually by a front desk attendant viewing the high floor rooms fitting the needs of the guest. The inability to provide a guest room specific attributes that they request upon check-in may lead to guest dissatisfaction, and a poor review posted on a travel-related website, potentially resulting in lost future revenue.

The control of room inventory based on room-specific attributes to generate incremental revenues for a hotel requires data to be stored at a very granular level, such as in the storage device 225 of the APRICOT system 110. Further, the pricing of the rooms factoring in the room-specific attributes must be stored and/or calculated by the system 110, such as by processor 200, in order to maximize the revenue generated from the room-specific attributes. Embodiments described herein include an attribute-based inventory control technology system 110 with a unified source of room inventory, where the mapping of room-specific attributes to individual rooms is maintained. Additionally, the system 110 maintains inventory controls that may be cascaded to other systems, such as a hotel guest reservation system (GRS) 115 or property management system (PMS) 120 of FIG. 1.

In addition to maintaining room-specific inventory with room-specific attributes mapped to individual rooms, embodiments of the APRICOT system 110 described herein may further provide hurdle rate controls, restrictions, and best-available rates. A hurdle rate may be the rate below which the property is better off leaving a room unsold. The hurdle rate may be established based on the estimated cost to the hotel of a guest occupying the room (calculated electrical load, water consumption, housekeeping costs, etc.), and possibly a floor rate below which the hotel may damage their reputation or future rate structure if given. Hurdle rates may also be calculated based on the likelihood of booking the room at a higher rate at a later date. Hurdle rate controls may be established by future reservation date for a product pool (i.e., collection of room types). The hurdle rate control may control room inventory by room type, rate, or length of stay by check-in date. Restrictions may be determined by rate pool and individual rates mapped to the rate pool. For example, restrictions may include dates that are closed to arrivals, maximum stays, minimum stays, or both a maximum and minimum stay. The best-available rate may be a rate established based on a future reservation date.

The APRICOT system 110 may maintain a record for shopping and booking transactions with inventory controls for a period of time into the future, or the "look-ahead" time period. The GRS 115 and the PMS 120 may have a fixed look-ahead period. The fixed nature of these look-ahead periods may be limited by the age and complexity of the systems, with expansion of the look-ahead period proving too expensive to justify based on the return on investment. The APRICOT system 110 may maintain flexibly most any reasonable look-ahead period, giving a hotel the ability to book considerably further into the future than conventional GRS 115 and PMS 120 systems with little or no incremental expense. The APRICOT system 110 may function with the GRS 115 and PMS 120, understanding their look-ahead restrictions, and function seamlessly with the PMS and GRS despite the additional look-ahead period available in the APRICOT system.

For example, the look-ahead time period may be 330 days into the future. The actual look-ahead time period may be the maximum look-ahead time for the GRS 115, the PMS 120, or the APRICOT system 110. According to an example embodiment, the APRICOT system may have a look-ahead time period of greater than 330 days. The APRICOT system with the greater look-ahead time period may maintain inventory for dates beyond the look-ahead windows of the GRS 115 and PMS 120 systems. The APRICOT system with the greater look-ahead window may periodically, such as daily, send a file maintenance transaction to add a day of inventory to the look ahead-time period of the GRS and PMS. For shopping and booking requests that originate from either the GRS or PMS that are outside of the look-ahead range, the APRICOT system may update the book/cancel count stored within the APRICOT system and send a confirmation message. However, the forced sell transaction will only be sent to the GRS or PMS when the inventory is available on the GRS or PMS to update the counts. For example, when the booked date falls into the look-ahead time period for the GRS and/or PMS. A "forced sell" transaction or forced sell message is a message sent from one reservation system (PMS, GRS, or APRICOT) to the other reservation systems to instruct them to flag a particular room as booked or unavailable for a specified time period. The forced sell message of example embodiments may be sent exclusively from the APRICOT system according to example embodiments described herein where the APRICOT system functions as the master booking agent.

FIG. 3 illustrates the dynamics of shopping and booking activity within the attribute-based pricing and reservation inventory control technology system that is in communication with the host GRS 115 and the PMS 120 of FIG. 1. According to the illustrated embodiment, all shopping and booking requests, regardless of their source, are sent to the APRICOT system 110 for processing and generating a determination on the request. Shopping and booking requests received by the APRICOT system 110 may include additional fields including property type, property-specific attributes, room-specific attributes, and add-on features. The APRICOT system may determine a price of the shopping and booking requests based on the user-selected information. The APRICOT system may determine a price of the shopping and booking requests based on the price/demand curve and/or a stored rate level. The determined price may be accepted by a user and a booking may then be accepted by the APRICOT system 110.

According to the illustrated embodiment, the shopping and booking requests may be received either through the GRS 115, the PMS 120, or directly to the APRICOT system 110. If a shopping/booking request is received at either the GRS or PMS, the request may be passed through to the APRICOT system that serves as the master booking agent, while GRS and PMS function as slave booking agents. The APRICOT system maintains the available inventory together with the stored/mapped attributes. Inventories maintained at the GRS and PMS may be updated based on feedback from the APRICOT system received by the GRS and PMS as Forced Sell messages or Cancel messages to update inventory counts. For example, the APRICOT system, upon confirming a booking of a particular room, will send the Forced Sell message to both the GRS and the PMS, regardless of where the booking request originated. The Forced Sell message to the GRS may simply include a room type that is booked such that the GRS decrements the inventory of that room appropriately. The Forced Sell message to the PMS may include a Room Type and Room Assignment such that the PMS system can decrement the room type inventory and remove the assigned room from the available inventory for the booked dates.

According to some embodiments, two distinct shopping paradigms may be supported by example embodiments of the present invention. A first shopping paradigm may include providing for display at a user's device (100 of FIG. 1), of properties that are within a specific radius of a point of interest (POI) and satisfy user-defined: a) property attributes; b) room-specific attributes; c) add-on features; and d) hotel brands, in response to specified search criteria. A second shopping paradigm may include providing for display at a user's device of properties that are within a specific region or sub-region as defined by polygons and satisfy user defined: a) property attributes; b) room-specific attributes; c) add-on features; and d) hotel brands. Table A provides a list of example searchable attributes and property types that may be stored within the APRICOT system 110.

TABLE A

Example Attributes

| Attributes/Amenities | Attributes/Amenities Cont'd | Property Types |
|---|---|---|
| ADA_Accessible | IndPetRestriction | All Inclusive |
| AdultsOnly | InteriorDoorways | Apartments |
| AirportShuttle | InRoomCoffeeTea | BedBreakfast |
| BeachFront | InRoomMiniBar | Castle |
| Breakfast | InRoomRefrigerator | Conventions |
| BusinessCenter | InRoomSafe | Economy |
| BusinessReady | Jacuzzi | Extended Stay |
| CarRentalCounter | KidsFacilities | Farm |
| Conventions | KitchenFacilities | First |
| Dataport | MealService | Luxury |
| Dining | MeetingFacilities | Moderate |
| DryClean | NoAdultTv | Motel |
| ExecutiveFloors | NonSmoking | Resort |
| FamilyPlan | OutdoorPool | Suites |
| FitnessCenter | Parking | |
| FreeLocalCalls | Pets | |
| FreeParking | Pool | |
| FreeShuttle | PublicTransportationAdjacent | |
| FreeWifiInMeetingRooms | RestrictedRoomAccess | |
| FreeWifiInPublicSpaces | Recreation RoomService | |
| FreeWifiInRooms | RoomService24Hours | |
| FullServiceSpa | RoomsWithBalcony | |
| GameFacilities | SkiInOutProperty | |
| Golf | SmokeFree | |
| GovtSafetyFire | SmokingRoomsAvail | |
| HiSpeedInternet | Tennis | |
| HypoallergenicRooms | WaterPurificationSystem | |
| IndoorPool | Wheelchair | |

In response to a booking being made, inventory is decremented in the APRICOT system 110, for example, by updating the inventory availability in the storage device 225. Inventory decremented may be for room type inventory as well as any add-on inventory that are made available to the property on an allocation basis and not on a consignment basis. For example, if a property is allotted ten tickets to a sporting event (e.g., if the property has 10 season tickets), inventory that is selected by a customer as an add-on is decremented from the available inventory. Room-specific attribute inventory is not required since in the lowest level of the inventory record is the individual room with its associated attributes. Thus, when a room is removed from the available inventory in response to a booking request, a room with the room-specific attributes booked is removed from the available inventory. Additionally, property-based add-ons may be inventory controlled in a property level inventory record. For example, a roll-away bed or a crib may be added-on to a customer's booking request. The property may have only a limited number of roll-away beds or cribs such that their inventory for the time period of the booking is decremented according to the requested add-ons of the booking.

Once a booking is made in the APRICOT system, a notification message may be sent to the host GRS to update the counts by room type and to the PMS to update the room that has been booked, as illustrated in FIG. 3. In an embodiment in which there are multiple rooms with identical room-specific attributes, the APRICOT system may send information to the PMS on the specific room that should be removed from inventory for the booked dates.

The pricing of room inventory, room-specific attributes, and add-on inventory may be fixed or dynamic. In an embodiment with fixed pricing, a room-specific attribute may be a fixed price regardless of the sold count (i.e., the number of those attributes sold for the requested time period) for the attribute. The fixed price of the attribute or add-on is added to a base rate (e.g., run-of-house rate) to determine a total price of the booking. In a more sophisticated form, attribute and add-on pricing may be dynamic where the price is variable based on the sold count for rooms. To manage room-specific attributes in a dynamic pricing model, a pricing structure may be established in the APRICOT system by the hotel, as illustrated in the example embodiment of Table B below. The pricing for a room-specific attribute may be determined in absolute terms or as a percentage of a reference price.

TABLE B

Dynamic Pricing Example

| Number of Ocean Front Rooms Sold | Add on Price to the Base Rate |
|---|---|
| 1-5 | $100 |
| 6-10 | $125 |
| 10-15 | $150 |
| >15 | $200 |

The APRICOT system may update and retain this pricing information at the attribute-specific level. If the price is variable as in a dynamic pricing model, an attribute-specific inventory record will be required and it may be kept synchronized with the detailed room level inventory records (i.e., room records with room-specific attributes) in the APRICOT system for every room booked or canceled.

While the aforementioned embodiments are directed toward hotel room booking, embodiments of the APRICOT system may further be configured for booking conference rooms, ball rooms, courtyards, or other event-related areas of a property. Conference rooms may use similar booking procedures as outlined above; however, booking of conference rooms may be performed in one-hour increments instead of daily increments. Pricing of conference rooms may also be dynamic based on time of day and demand of conference room services.

The above-described embodiments introduce a new paradigm for hotel shopping and booking on a consumer-direct platform. In addition to attributes at the property level, room level, and add-ons, a user can search based on points-of-interest (POIs), locations (e.g., a city), or sub-locations (e.g., a neighborhood). Points-of-interest searches may be based on a radial search emanating from the point-of-interest with a radial distance that may be user-selectable. Locations and sub-locations may be custom polygons for specific geographic regions.

According to example embodiments of the APRICOT system, each hotel may include a master inventory including a list of property-specific attributes, a list of room-specific attributes, a list of add-on features for a room (e.g., a roll-away bed), a list of add-on features (e.g. activities), an inventory element for each room at the property with attributes assigned, an inventory element for each meeting/conference room or event space with attributes assigned, and inventory carried for specific add-ons. For each attribute, room, internal and external add-on, or meeting room/event space, there may be a price collection with multiple price points for each item. The price can be a flat rate or a percentage of the room rate that is to be variable as a function of rooms sold count, as described above. The price may include qualifiers such as loyalty tier (e.g., gold, platinum, etc.), corporate rate codes, negotiated rates (GOV, MIL, etc.), etc. The price collection can include a fractional price for hourly stays for airport rooms or for conference/event spaces. The detailed inventory by date is obtained from the master inventory where all attributes are used for a detailed inventory. All prices can be modified and updated either manually or by revenue management controls which may exist at all levels of rooms/attributes/add-ons, etc.

FIG. 4 illustrates a logical network diagram in accordance with an example implementation of a reservation system according to example embodiments of the present invention. The inventory availability may be maintained at APRICOT hotel availability cache 112 within the APRICOT system 110 as the primary or master inventory manager. All availability, sell, and shopping results from all channels may come to the load balancer 300 for appropriate routing. The load balancer 300 may maintain and manage traffic to/from the attribute shopping cache of the APRICOT system 110 and all instances of booking servers 310. The booking servers 310 may function together with an object relational mapping system 315 to perform booking functions. The object-relational mapping system 315 may function as a translator between the relational database 320 representation of the APRICOT data into a form more readily understandable to the APRICOT applications. Data stored in relational databases 320, 325 has benefits of readability and forced constraints to protect the data from corruption or invalid conditions. However, the data stored in the relational databases 320, 325, may not be efficient for manipulation by booking applications. Relational databases 320, 325 also support reporting and statistics easier than complex data objects used in solving problems within the APRICOT system 110. The object-relational mapping system 315 allows the booking application programs to use the relational data in an efficient manner while preserving the benefits of a relational data model as described further below.

According to the illustrated embodiment, availability requests from both PMS 120 and GRS 115 may go through the load balancer 300 to the APRICOT hotel availability cache 112 of the APRICOT system 110. Booking requests from both PMS 120 and GRS 115 may go through load balancer 300 to booking servers 310 of the APRICOT system. The APRICOT system 110 may return success/failure messages to the PMS 120 and GRS 115 as appropriate. The object relational mapping system 315 may reside over a database performing object mapping as well as some defined caching to ensure fast response times as described above. Meanwhile, the inventory control application may have mirrored relational database models 320, 325, which allow for reports/SQL queries against mirrored reservations data. A cache loader 330 may be updated by the APRICOT system 110 and the hotel revenue management system 340. The relational database models 320, 325, and the cache loader 330 enable the object relational mapping system 315 to respond to booking requests with less latency to improve the customer booking experience.

An example embodiment of an availability request message flow is described below as originating from the APRI- COT system 110, the PMS 120, and the GRS 115, with respect to the system diagram of FIG. 4. An availability request directly into APRICOT may be handed to the load balancer 300 which may direct the message to the APRICOT hotel availability cache 112. The APRICOT hotel availability cache 112 may evaluate the request and return viable properties and rooms to the requestor. An availability request that is received at the PMS 120 may be handed to the load balancer 300, which in turn directs the message to the APRICOT hotel availability cache 112 which then evaluates the request and returns available properties and rooms to the requestor. The amount of detail of the available properties and rooms provided back to the PMS 120 may be dependent upon what is supported within the system. For example, the PMS may not support room attributes beyond bed type for certain properties, in which case the detail level provided back to the PMS from the APRICOT hotel availability cache 112 may be limited to room bed type. When an availability request is received at a GRS 115, the request may be routed to the load balancer, which may then direct the message to the APRICOT hotel availability cache 112, which will evaluate the request and return viable properties and rooms to the requestor. Similar to the PMS, the amount of detail provided back to the GRS 115 is dependent upon what can be supported within the GRS system.

The sell message flow is further described herein with reference to the system diagram of FIG. 4. A sell message received directly into the APRICOT system 110 may be handed to the load balancer 300 which directs the message to the least-busy book server 310 to process the request. The selected book server 310 may make use of the object relational mapper 315 to obtain up-to-date availability from the relational database 320. If the rate and room of the sell request are still available, the sell will be processed, triggering an update to the APRICOT hotel availability cache 110 via cache loader 330. Notification may optionally be sent to the revenue management system 340. Further, the reporting/recovery relational database 325 may be updated to reflect the sale and sale details. The specific room and all details will be returned to the requestor while APRICOT sends a force-sell message to the GRS 115 with as much detail as the GRS is capable of handling, and a similar force-sell message with similar constraints to the PMS 120.

A sell message coming from the PMS 120 may be handed to the load balancer 300, which directs the message to the least-busy book server 310 to process the request. The book server may make use of the object relational mapper 315 to obtain up-to-date availability from the relational database 320. If the rate and room of the sell request are still available, the sell will be processed, triggering an update to the APRICOT hotel availability cache 112 via the cache loader 330. Notification may also be sent to the revenue management system 340. Further, the reporting/recovery relational database 325 may be updated to reflect the sale. The specific room and all relevant details may be returned to the requestor, while the APRICOT system 110 sends a force-sell message to the GRS 115 with as much detail as the GRS is capable of handling and a similar force-sell message with similar constraints to the PMS 120.

A sell message coming from the GRS 115 may be handed to the load balancer 300, which directs the message to the least-busy book server 310 to process the request. The book server 310 may make use of the object relational mapper 315 to get up-to-date availability from the relational database 320. If the rate and room of the sell request are still available, the sell request will be processed, triggering an update to the APRICOT hotel availability cache 110 via the cache loader 330. Notification may also be sent to the revenue management system 340. Further, the reporting/recovery relational database 325 may be updated to reflect the sale. The specific room and all relevant details will be returned to the requestor, while the APRICOT system 110 will send a force-sell message to the GRS 115 with as much detail as the GRS is capable of handling, and a similar force-sell message with similar constraints to the PMS 120.

Whether by sell trigger or by a nightly (or otherwise periodic) process, the revenue management system 340 may send updated controls to the APRICOT system 110. These controls may include open/close indicators, new hurdle rates, and other property constraints or details. These controls may be applied to the relational database 320 and the reporting/recover relational database 325. These updates may then trigger the cache loader 330 to update the APRICOT hotel availability cache 110.

The attribute shopping cache within the APRICOT system 110 may support searches for any or all attributes that exist within an area being searched. The attribute shopping cache may enable radius (e.g. POI-based) or polygon (e.g. location-based) searches to be conducted of properties. Attributes and pricing data may be stored within the attribute shopping cache (e.g., in storage device 225) to provide pricing data and to dynamically calculate room prices as searches are conducted. As more property attributes and room-specific attributes are specified, the attribute shopping cache of the APRICOT system 110 may narrow the search results. Once a booking is made, a customer may be given a specific room number rather than a generic room-type booking confirmation.

Embodiments of the present invention may be implemented through proxy deployment ensuring consistent content across all channels. FIG. 5 illustrates such an example implementation where the PMS 120 and GRS 115 pass-through shopping requests and booking/cancel requests to the APRICOT system 110 of a hotel or hotel chain environment 400. The APRICOT system 110 further receives updated content from hotel properties such as inventory updates, attribute updates, etc. The APRICOT system 110 provides forced sell/cancel messages to each of the GRS 115 and the PMS 120 as described above. However, the APRICOT system 110, which is the inventory master of the illustrated embodiment, may further communicate with a proxy deployment, which may be, for example at a service provider data center. The service provider data center may provide a network through which a customer may enter shopping requests and booking/cancel requests at user interface device 420. The user may include a consumer or a travel agent. In either case, the APRICOT system proxy deployment 410 may provide a low-latency implementation of the APRICOT system without sacrificing the aforementioned benefits of the APRICOT system. The proxy deployment may, in turn, communicate with APRICOT system 110.

FIG. 6 is a flowchart illustrative of a system, method, and program product according to example embodiments of the invention. The flowchart operations may be performed by a system, such as the APRICOT system 110 of FIGS. 1-5, operating over a communications network, such as that shown in FIG. 1. It will be understood that each block of the flowchart, and combination of blocks in the flowchart, may be implemented by various means, such as hardware, firmware, processor, circuitry, and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware), such as depicted in FIG. 2, to produce a machine, such that the resulting computer or other programmable apparatus embody means for implementing the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

An example embodiment of a method for attribute-based pricing inventory reservation control is depicted in the flowchart of FIG. 6. According to the depicted method, hotel rate structure by room type and rate level may be stored for one or more properties at 600. The rate structure and room type may be stored, for example, in a database which may be stored in storage device 225 of the APRICOT system 110. In a similar manner, room-specific attribute pricing structures for one or more room-specific attributes may also be stored at 610. A room request may be received that includes request parameters that includes at least one room-specific attribute at 620. The request may be received at the APRICOT system 110, for example, through the communication interface 230 to processor 200 over network 105. The inventory, which may be stored in storage device 225 of the APRICOT system 110, may be analyzed to determine the availability of a room that satisfies the request parameters at 630. The processor 200 may calculate a rate for a room satisfying the request parameters at 640. A booking request may be received to book the room satisfying the request parameters at 650, such as through communication interface 230 to processor 200 over network 105. The APRICOT system 110 may then update inventory, such as in storage device 225, to reflect the booking of the room satisfying the request parameters at 660. A forced sell message may be provided for transmission, such as through communication interface 230, at 670. The forced sell message may be sent, for example, to the GRS 115 and/or the PMS 120 in order for them to update locally stored inventory.

In an example embodiment, an apparatus for performing the method of FIG. 6 above may comprise a processor (e.g., the processor 200) configured to perform some or each of the operations (600-670) described above. The processor may, for example, be configured to perform the operations (600-670) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 600-670 may comprise, for example, the processor 40 and/or a device or circuit for executing instructions or executing an algorithm for processing information as described above.

As described above and as will be appreciated by one skilled in the art, embodiments of the present invention may be configured as a system, method or electronic device. Accordingly, embodiments of the present invention may be comprised of various means including entirely of hardware or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for operating a hotel reservation system, wherein the hotel reservation system comprises an attribute-based pricing and reservation inventory control technology system in communication with at least one of a hotel guest reservation system and a property management system, the method comprising:

storing, in an attribute-based pricing and reservation inventory control technology system database, hotel rate structure by room type and rate level for one or more properties, wherein the attribute-based pricing and reservation inventory control technology system database comprises a relational database;

storing, in the attribute-based pricing and reservation inventory control technology system database, room-specific attribute pricing structures and add-on feature pricing structures for one or more room-specific attributes and add-on features, wherein add-on features comprise property-based add-ons to a room request available to a property on an allocation basis;

receiving, from the at least one of the hotel guest reservation system and the property management system, through a communication interface at a processor of the attribute-based pricing and reservation inventory control technology system, a room request comprising request parameters, wherein the request parameters include at least one room-specific attribute, at least one add-on feature, and a date range;

analyzing inventory of the attribute-based pricing and reservation inventory control technology system database to determine availability of a room that satisfies the request parameters, wherein analyzing the inventory comprises translating the request parameters into a relational database representation;

analyzing add-on inventory of the at least one add-on feature;

calculating a rate for a room satisfying the request parameters in response to a room being available that satisfies the request parameters and an add-on feature being available that satisfies the request parameters;

receiving, from the at least one of the hotel guest reservation system and the property management system, through the communication interface at the processor of the attribute-based pricing and reservation inventory control technology system, a booking request to book the room satisfying the request parameters and the at least one add-on feature;

selecting a first book server from a set of book servers comprising the first book server and a second book server, wherein a load of the first book server is less than a load of the second book server;

processing, by the first book server, the booking request, wherein processing the booking request comprises booking the room and sending a confirmation message;

updating inventory of the attribute-based pricing and reservation inventory control technology system database to reflect the booking of the room satisfying the request parameters and the at least one add-on feature;

determining that the date range falls outside a look-ahead window, the look-ahead window specifying a period of time into the future for which at least one of the hotel guest reservation system and the property management system maintains a record for booking transactions;

during the period of time, periodically communicating to at least one of the hotel guest reservation system and the property management system a file maintenance transaction, wherein a day of inventory is added to the look-ahead window of at least one of the hotel guest reservation system and the property management system in response to the file maintenance transaction; and after processing the booking request and determining that the date range falls within the look-ahead window, providing for transmission of a forced sell message to the at least one of the hotel guest reservation system and the property management system, the forced sell message indicating that the room is unavailable for the date range.

2. The method of claim 1, further comprising:
storing, in the database, property attributes for the one or more properties.

3. The method of claim 1, wherein room-specific attributes include at least one of whether or not the room includes a balcony, whether or not the room includes a refrigerator, whether or not the room includes network connectivity, the type of view from the room, the number and type of beds in the room, or the floor level of the room.

4. The method of claim 1, wherein the forced sell message comprises an inventory decrement instruction comprising a room type and date range.

5. The method of claim 1, further comprising mapping room-specific attributes to individual rooms.

6. The method of claim 5, further comprising storing room inventory including the room-specific attributes, wherein in response to receiving the booking request to book the room satisfying the request parameters, decrementing the inventory of the room satisfying the request parameters.

7. The method of claim 6, further comprising:
receiving a sell request comprising room sell request parameters;
decrementing the inventory of the room satisfying the sell request parameters; and
sending a sell response confirming a booking of a room satisfying the sell request parameters.

8. A hotel reservation system, wherein the hotel reservation system comprises an attribute-based pricing and reservation inventory control technology system in communication with at least one of a hotel guest reservation system and a property management system, comprising at least one processor and at least one memory including computer program code, the at least one memory and the computer program code configured to, with the at least one processor, cause the hotel reservation system to at least perform:

store, in an attribute-based pricing and reservation inventory control technology system database, hotel rate structure by room type and rate level for one or more properties, wherein the attribute-based pricing and reservation inventory control technology system database comprises a relational database;

store, in the attribute-based pricing and reservation inventory control technology system database, room-specific attribute pricing structures and add-on feature pricing structures for one or more room-specific attributes and add-on features, wherein add-on features comprise property-based add-ons to a room request available to a property on an allocation basis;

receive, from the at least one of the hotel guest reservation system and the property management system, through a communication interface of the attribute-based pricing and reservation inventory control technology system, a room request comprising request parameters, wherein the request parameters include at least one room-specific attribute, at least one add-on feature, and a date range;

analyze inventory of the attribute-based pricing and reservation inventory control technology system database to determine availability of a room that satisfies the request parameters, wherein analyzing the inventory comprises translating the request parameters into a relational database representation;

analyze add-on inventory of the at least one add-on feature;

calculate a rate and a hurdle rate for a room satisfying the request parameters in response to a room being available that satisfies the request parameters and an add-on feature being available that satisfies the request parameters;

receive a booking request, from the at least one of the hotel guest reservation system and the property management system, through the communication interface of the attribute-based pricing and reservation inventory control technology system, a booking request to book the room satisfying the request parameters and the at least one add-on feature;

selecting a first book server from a set of book servers comprising the first book server and a second book server, wherein a load of the first book server is less than a load of the second book server;

processing, by the first book server, the booking request, wherein processing the booking request comprises booking the room and sending a confirmation message;

update inventory of the attribute-based pricing and reservation inventory control technology system database to reflect the booking of the room satisfying the request parameters and the at least one add-on feature;

in response to booking the room, determine that the date range falls outside a look-ahead window, the look-ahead window specifying a period of time into the future for which at least one of the hotel guest reservation system and the property management system maintains a record for booking transactions;

during the period of time, periodically communicate to at least one of the hotel guest reservation system and the property management system a file maintenance transaction, wherein a day of inventory is added to the look-ahead window of at least one of the hotel guest reservation system and the property management system in response to the file maintenance transaction; and after processing the booking request and determining that the date range falls within the look-ahead window, provide for transmission of a forced sell message to the at least one of the hotel guest reservation system and the property management system, the forced sell message indicating that the room is unavailable for the date range.

9. The hotel reservation system of claim 8, wherein the hotel reservation system is further configured to:
store, in the database, property attributes for the one or more properties.

10. The hotel reservation system of claim 8, wherein room-specific attributes include at least one of whether or not the room includes a balcony, whether or not the room includes a refrigerator, whether or not the room includes network connectivity, the type of view from the room, the number and type of beds in the room, or the floor level of the room.

11. The hotel reservation system of claim 8, wherein the forced sell message comprises an inventory decrement instruction comprising a room type and date range.

12. The hotel reservation system of claim 8, further comprising causing the hotel reservation system to map room-specific attributes to individual rooms.

13. The hotel reservation system of claim 12, wherein the hotel reservation system is further caused to store room inventory including the room-specific attributes, wherein in response to the hotel reservation system being caused to receive the booking request to book the room satisfying the request parameters, causing the hotel reservation system to decrement the inventory of the room satisfying the request parameters.

14. The hotel reservation system of claim 13, wherein the hotel reservation system is further caused to:
receive a sell request comprising room sell request parameters;
decrement the inventory of the room satisfying the sell request parameters; and
send a sell response confirming a booking of a room satisfying the sell request parameters.

15. A computer program product comprising at least one non-transitory computer-readable storage medium having computer-executable program code instructions stored therein, the computer-executable program code instructions comprising:
program code instructions for storing, in an attribute-based pricing and reservation inventory control technology system database, hotel rate structure by room type and rate level for one or more properties, wherein the attribute-based pricing and reservation inventory control technology system database comprises a relational database;

program code instructions for storing, in the attribute-based pricing and reservation inventory control technology system database, room-specific attribute pricing structures and add-on feature pricing structures for one or more room-specific attributes and add-on features, wherein add-on features comprise property-based add-ons to a room request available to a property on an allocation basis;

program code instructions for receiving, from the at least one of the hotel guest reservation system and the property management system, through a communication interface at a processor of the attribute-based pricing and reservation inventory control technology system, a room request comprising request parameters, wherein the request parameters include at least one room-specific attribute and at least one add-on feature;

program code instructions for analyzing inventory of the attribute-based pricing and reservation inventory control technology system database to determine availability of a room that satisfies the request parameters, wherein analyzing the inventory comprises translating the request parameters into a relational database representation;

program code instructions for analyzing inventory of the at least one add-on feature;

program code instructions for calculating a rate and a hurdle rate for a room satisfying the request parameters in response to a room being available that satisfies the request parameters and the at least one add on feature being available that satisfies the request parameters;

program code instructions for receiving, from the at least one of the hotel guest reservation system and the property management system, through the communication interface at the processor of the attribute-based pricing and reservation inventory control technology system, a booking request to book the room satisfying the request parameters, the at least one add-on feature, and a date range;

program code instructions for selecting a first book server from a set of book servers comprising the first book server and a second book server, wherein a load of the first book server is less than a load of the second book server;

program code instructions for processing, by the book server, the booking request, wherein processing the booking request comprises booking the room and sending a confirmation message;

program code instructions for updating inventory of the attribute-based pricing and reservation inventory control technology system database to reflect the booking of the room satisfying the request parameters and the at least one add-on feature;

program code instructions for, in response to booking the room, determining that the date range falls outside a look-ahead window, the look-ahead window specifying a period of time into the future for which at least one of the hotel guest reservation system and the property management system maintains a record for booking transactions;

program code instructions for, during the period of time, periodically communicating to at least one of the hotel guest reservation system and the property management system a file maintenance transaction, wherein a day of inventory is added to the look-ahead window of at least one of the hotel guest reservation system and the property management system in response to the file maintenance transaction;

program code instructions for waiting until the date range falls within the look-ahead window; and program code instructions for, after processing the booking request and determining that the date range falls within the look-ahead window, providing for transmission of a forced sell message to the at least one of the hotel guest reservation system and the property management system, the forced sell message indicating that the room is unavailable for the date range.

16. The computer program product of claim 15, further comprising: program code instructions for mapping room-specific attributes to individual rooms; program code instructions for storing room inventory including the room-specific attributes; and program code instructions for decrementing the inventory of the room satisfying the request parameters in response to receiving a booking request to book the room satisfying the request parameters.

17. The method of claim 1, wherein add-on features include at least one of a roll-away bed or a crib.

* * * * *